United States Patent [19]
Felice et al.

[11] 3,891,849
[45] June 24, 1975

[54] MEANS FOR INTEGRATING ERYTHEMAL SPECTRAL RADIATION

[75] Inventors: Patrick E. Felice, Jeannette; Robert R. Ferber, Murrysville, both of Pa.

[73] Assignee: Westinghouse Electric Corporation, Pittsburgh, Pa.

[22] Filed: Jan. 30, 1974

[21] Appl. No.: 438,060

[52] U.S. Cl. .................. 250/372; 250/510
[51] Int. Cl. ........................... G01j 1/02
[58] Field of Search .................. 250/372, 510

[56] References Cited
UNITED STATES PATENTS 3,062,958  11/1962  Warner .................. 250/372
3,427,489  2/1969  Walsh .................. 250/372 X
3,710,115  1/1973  Jubb .................. 250/372

*Primary Examiner*—Archie R. Borchelt
*Attorney, Agent, or Firm*—C. L. Menzemer

[57] ABSTRACT

Means for sensing solar radiation having a wavelength in the erythemal range of 2800 to 3200 A is provided which comprises a radiation sensing means electrically connected to the circuit for integrating the radiation within the erythemal range including a means for indicating the integrated radiation.

14 Claims, 6 Drawing Figures

PATENTED JUN 24 1975

3,891,849

MEANS FOR INTEGRATING ERYTHEMAL SPECTRAL RADIATION

FIELD OF THE INVENTION

The present invention relates to a means for detecting and integrating radiation falling within the erythemal spectral region of 2800 to 3200 A wavelength.

BACKGROUND OF THE INVENTION

One well-known effect of exposure to the sun by the human body is erythema, otherwise known as sunburn. While the human skin is made up of several different and distinct layers, the epidermis, the outer surface, is of particular importance with respect to erythema and suntanning. The epidermis is stratified and is composed of four layers the outer of which is the stratum corneum, which is composed of dead flattened cells, the stratum granulosum lying thereunder, the stratum spinousum, and the lower most layer, the stratum basale which is the site formation of melanin. The formation of melanin, a dark-brown substance, provides the coloration for skin complexion and also that which produces the brown tones of a suntan. While the exact physiological mechanism for sunburning and suntanning are complicated and little understood, there is general agreement that the ultraviolet rays in the 2800 to 3200 A wavelength band are primarily responsible for erythema. These wavelengths can penetrate to the necessary depth and resulting erythema has been found to result from secondary effects of a primary photochemical reaction occurring in the stratum spinousum layer of the epidermis. The nature of the active material produced by this primary reaction is unknown, but as a result of this substance, the blood vessels are dilated resulting in erythema and other signs of inflammation and edema.

Natural protection against erythema is provided by the epidermis by a gradual thickening thereof caused by exposure to solar radiation. The natural protection is generally believed to be more pronounced when the ultraviolet exposure does not exceed the erythemal threshold values. It is desirable, therefore, to have available a means for determining the amount of ultraviolet exposure within the erythemal spectral region to avoid reaching a threshold level in which erythema is developed.

Many devices have been proposed and developed for measuring various frequencies of ultraviolet radiation including U.S. Pat. Nos. 3,062,958; 2,349,754; 3,247,413; 2,114,163; and the like. Most importantly, however, is U.S. Pat. No. 2,531,000 which provides an erythemal meter for measuring radiant energy from 2800 to 3200 A wavelengths, the erythemal spectral region. This meter is useful for directly reading the erythemal component of solar radiant flux. Accordingly, with such a device it is possible for one to determine the nature of the radiation to which the body is to be exposed, and, particularly, the intensity of the erythemal spectral range.

It is desirable to have a means for not only determining the precise amount of erythemal radiation component, but also for measuring the total amount of erythemal radiation to which the body has been exposed during any given time period and provide a warning of impending erythemal threshold levels. Therefore, it is an object of the present invention to provide an improved erythemal sensor and means in combination therewith for integrating the amount of solar erythemal radiant energy during any given period of exposure.

SUMMARY OF THE INVENTION

The present invention provides an improved ultraviolet sensing means for the erythemal solar radiation spectrum. The invention also provides a means for integrating the total erythemal radiation to provide a visual indication or an audible signal when the erythemal threshold level is reached or upon impendent levels.

Generally, the present invention provides an improved erythemal radiation sensor which comprises a thin film vacuum deposition interference filter which permits the passage of the ultraviolet radiation in the 2800 to 3200 A region and reflects all other radiation. On the back of the interference filter is phosphor coating, preferably magnesium tungstate phosphor which converts the ultraviolet energy passing through the filter to visible energy. A photocell or photoelectric cell is positioned adjacent the phosphor coated filter to receive the visible energy on its active surface and provide either a photoresistive change or an electrical current which is a function of the intensity of the visible light generated by the phosphor coating. The filter and photocell are securely positioned within a housing, preferably of an elastomeric material having a heat shrinkable outer member.

It has been found that in the manufacture of sensors of the present invention, that very small pin holes develop during the vacuum deposition of the thin film interference filter permitting small amounts of undesired radiation to pass through. Accordingly, it is preferred to include a plurality of filters in the sensor of the present invention to provide highly accurate conversion of only the erythemal spectral region.

Thus, the preferred sensor includes a first filter which permits the passage of all radiation except that in the 4600 to 6600 A range. The thin film interference filter is provided adjacent the first filter to reflect all of the energy passed by the first filter except that energy lying within the 2800 to 3200 A, erythemal, range. Preferably, the interference filter has a peak transmission at 3000 A.

A magnesium tungstate phosphor is provided either on a separate thin film substrate or on the back of the interference filter. The magnesium tungstate phosphor converts the ultraviolet radiation transmitted through the interference filter to visible light having a peak at about 5500 A.

A third filter is positioned adjacent the phosphor and along the optical axis of the sensor to filter any ultraviolet radiation that was not reflected by the interference filter and transmits the visible energy generated by the phosphor. A fourth filter is positioned adjacent the third filter that permits passage therethrough of the generated visible energy but which absorbs any infrared energy not reflected by the interference filter.

A photoresistive cell, preferably of cadmium sulfide, is positioned along the optical axis to receive the generated visible energy. The photocell preferably peaks at 5500 A and changes its resistance as a function of the intensity of the visible energy impinging upon its surface.

The assembly of filters, phosphor and photocell are tightly secured within a molded elastomeric member having an opening or window at one end to permit radiant energy to impinge the first filter. At its opposite end, a pair of openings are provided for the electrical leads from the photocell. Additionally, a heat shrinkable tubular member is provided over the outer surface of the molded elastomeric member. The erythemal sensor thus constructed is of small size and capable of withstanding adverse conditions such as humidity, sand, abusive handling, and the like.

In one embodiment of the present invention the photocell of the sensing means is electrically connected to the input of a two-stage transistor amplifier for the purpose of changing the input base current of the input transistor with varying light intensities from the magnesium tungstate phosphate. Base current, for example, of $10^{-6}$ amps yields collector currents of approximately $18 \times 10^{-3}$ amps in the collector of the second stage. From this current gain it is possible to drive a small permanent magnet DC motor or a mercury microcoulometer to provide the visual output required for the integrated radiation. The microcoulometer, for example, requires only 5 milliamps to drive it and a small DC motor requires about 18 milliamps of current for startup. Thus, with an input of $5 \times 10^{-6}$ amps into the base input of the first transistor, equivalent to 5 milliwatts per cm² of solar flux, a motor can be driven.

In another embodiment, the erythemal sensing means is connected to the base circuit of a transistor in a common emitter configuration. The collector circuit of the transistor is connected to a small 1.5 volt DC motor and a conventional flashlight battery. A mechanical connection by means of worm gear reduction is made to a Veeder-Root counter, or other indicating means such as a threaded screw and pointer arrangement. Thus, when the sun intensity is sufficiently high, that is, in the order of 10 milliwatts per cm² or greater, the output of the solar cell is high enough to partially turn on the transistor such as a 2N414. Once gated on, increases in intensity increase the output current of the photocell which in turn increases the base current of the transistor. This causes a collector current increase by the beta factor of the transistor. Since the motor is connected to the collector circuit, the increased current will speed up the motor. Conversely, operation is reversed in a decreasing sunlight condition. When the light falls below 10 milliwatts per cm², the transistor is essentially cut-off which removes the battery from the circuit.

Other advantages of the present invention will become apparent with a perusal of the following description of a presently preferred embodiment of the invention taken in connection with the accompanying drawings.

PRESENTLY PREFERRED EMBODIMENTS

Figure 1:
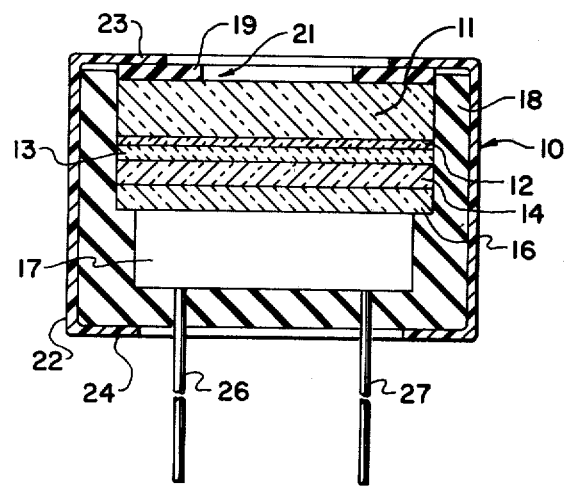
FIG. 1 is an elevation in partial section of the preferred erythemal sensing means of the present invention.

Referring to FIG. 1, erythemal sensing means 10 is preferably of a small size. For example, it has been found that the sensing means 10 having an outer diameter approximately 0.7 inches and an overall length of about 0.5 inches is suitable for use in making a small integrating meter of a size comparable to conventional photographic light meters.

Figure 2:
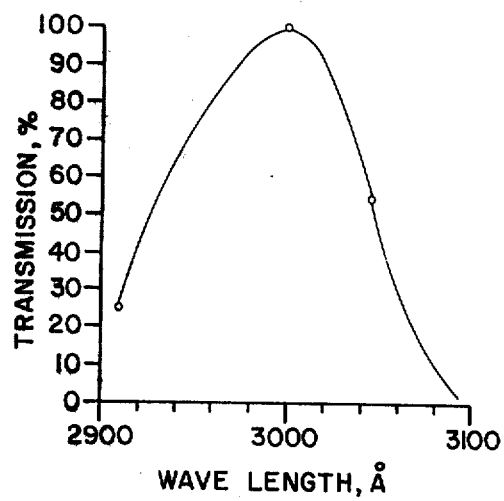
FIG. 2 is a transmission curve of the thin film interference filter of FIG. 1 vs. wavelength.

Erythemal sensing means 10 preferably comprises a first filter 11 which permits the transmission of all radiant energy except visible light between 4600 to 6600 A. First filter 11 has a diameter of 0.50 inches and an overall length of 0.125 inches, for example. First filter 11 is preferably fabricated from a Corning No. 7-54 glass filter commercially available from the Corning Glass Works, Corning, N.Y. Positioned in an abutting relationship to first filter 11 and along the optical axis of sensing means 10 is thin film interference filter 12. Interference filter 12 is designed to reflect all energy transmitted by first filter 11 except that energy lying between 2800 to 3200 A., and preferably has transmission curve as shown in FIG. 2. As can be seen from FIG. 2, interference filter 12 has a peak transmission at about 3000 A. Interference filter 12 preferably includes a hydrophobic substrate to prevent deterioration caused by humidity.

A magnesium tungstate ($MgWO_4$) phosphor is coated on the reverse side of the thin film interference filter 12. The magnesium tungstate phosphor converts all ultraviolet energy up to 3000 A to a visible energy with a conversion efficiency of approximately 80 percent. The peak visual energy generated by the magnesium tungstate phosphor is about 5500 A.

A third filter 14 is positioned adjacent the magnesium tungstate phosphor to absorb any ultraviolet energy that is not reflected by the interference filter 12. Third filter 14 transmits the visible energy generated by magnesium tungstate phosphor coating 13. Preferably, third filter 14 has a diameter of approximately 0.50 inches and a length of approximately 0.040 inches and is a Corning No. 3-71 glass filter. Positioned in abutting relationship with third filter 14 and along the optical axis of sensing means 10 is fourth filter 16 capable of transmitting the visible energy generated by phosphor coating 13 and absorbing any infrared energy not reflected by second filter 12. Preferably, fourth filter 16 has a diameter of 0.50 inches and a length of approximately 0.040 inches and is a Corning BG-18 glass filter.

Positioned in an abutting relationship with fourth filter 16 is photocell 17. Photocell 17 may be, for example, a cadmium sulfide photo-conducting cell such as a CDS-9 manufactured by Pioneer Research Corporation, Forest Park, Ill. or a Clairex photocell having a diameter of 0.43 inches and a length of 0.136 inches. Preferably, the cadmium sulfide cell provides a photoresistive change as a function of intensity of the visible energy generated by the magnesium tungstate phosphor. As an alternate method of fabrication, the magnesium tungstate phosphor can be sprayed as a fine film, using a Lucite lacquer carrier, onto the cover plate of the cadmium sulfide cell.

An elastomeric molded encapsulating member 18 is provided that securely holds in nested relationship the filters and the photocell. Preferably, encapsulation member 18 is made of a black molded rubber. A black rubber washer 19 is positioned over first filter 11 and includes an outer diameter equal to the inner diameter of encapsulating member 18. Opening or window 21 of washer member 19 has a diameter which is determined by calibration of the particular circuit in which sensing means 10 is included. Washer 19 is positioned by means of heat shrinkable tubing 22 having a first annular flange 23 in contact with washer 19. Outer tubular member 22 also includes a second annular flange 24 adapted to engage the bottom portion of elastomeric member 18. A pair of openings are provided in elastomeric member 18 to permit passage therethrough of leads 26 and 27 of photocell 17.

Figure 3:
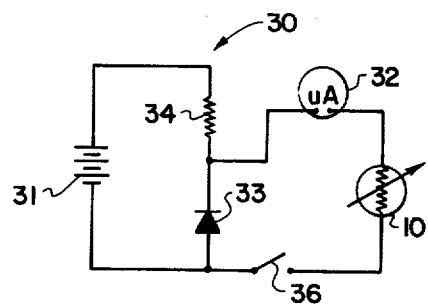
FIG. 3 is a circuit diagram for use with the sensing means of FIG. 1 to indicate the intensity of the erythemal component of solar radiation.

With reference to FIG. 3, a simple circuit diagram is shown for use with erythemal sensing means 10. Circuit 30 includes a battery 31 of 9 volts. Meter 32, for example, a 500 $\mu$amp full scale meter similar in construction to conventional photographic light meters can be used. A zener diode 33 and a resistor 34 (810 $\Omega$) permit the circuit to work on an 8.2 volt or lower voltage independent of the battery voltage as long as the battery voltage is higher than 8.2 volts. By utilization of zener diode 33 and resistor 34, constant accuracy of the meter readings are obtained for the life of the battery. A momentary switch 36 is provided to permit activation of the circuit when meter, sensing means 10, is pointed in the direction of the sun. Upon release of the switch, the meter pointer returns to the zero position.

Meter 32, for example, can be provided with a face having various zone indicia. These indicia would indicate permissible exposure times in order to reach the erythemal threshold level. While a device of the type shown in FIG. 3 provides useful information at the time of the reading, variations during the period of exposure of erythemal radiation requires frequent readings in order to avoid exposure beyond the erythemal threshold. Accordingly, it is preferred that the erythemal sensing means 10 be connected to a circuit for integrating the total erythemal radiation during a period of exposure and provide a visual or audible warning prior to reaching threshold levels.

Figure 4:
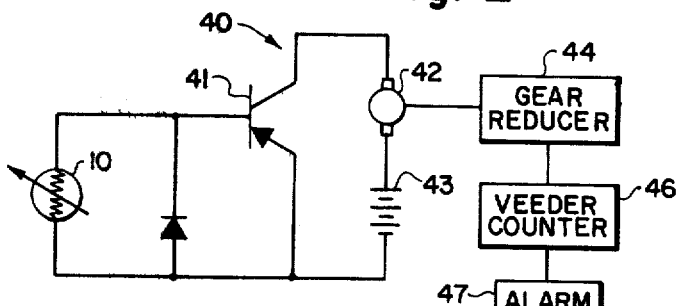
FIG. 4 is a simplified circuit diagram of an erythemal integrator for use with the sensing means shown in FIG. 1.

With reference to FIG. 4, a simplified circuit diagram of an erythemal integrator is shown. Circuit 40 includes an erythemal sensing means 10' electrically connected to the base of a PNP transistor 41 in common emitter configuration. Transistor 41 can be, for example, a 2N414 PNP transistor. The collector of transistor 41 is connected to a small 1.5 volt DC motor 42. A battery 43 such as conventional C or D size flashlight battery is connected to motor 42. The output shaft of motor 42 is connected to gear reducer means 44, such as a worm gear reducer, the output of which is connected to a counter 46 such as a Veeder-Root counter. Preferably, a small alarm 47 is connected to the Veeder-Root counter 46 to provide an audible sound whenever a predetermined erythemal threshold level of radiation has been reached.

When the sun intensity is sufficiently high, for example on the order of 10 milliwatts per $cm^2$ or greater, the output of sensor 10' is sufficiently high to partially turn on transistor 41. This causes a collector current increase by the beta factor of the transistor. Since the motor is connected to the collector circuit, the increase current will speed the motor up. Conversely, any decrease in erythemal radiation will cause the motor to rotate more slowly.

Alternatively cadmium sulfide photocell 17 of erythemal sensor 10' can be connected to the input of a typical two-stage transistor amplifier for the purpose of changing the input base current of the input transistor with varying light intensities. For example, base current of $10^{-6}$ amps yields collector current of approximately $18.0 \times 10^{-3}$ amps in the collector of the second stage. From this current gain it is possible to drive a small DC motor such as a Wilson DC motor which requires approximately 18 milliamps of current for startup.

Figure 5:
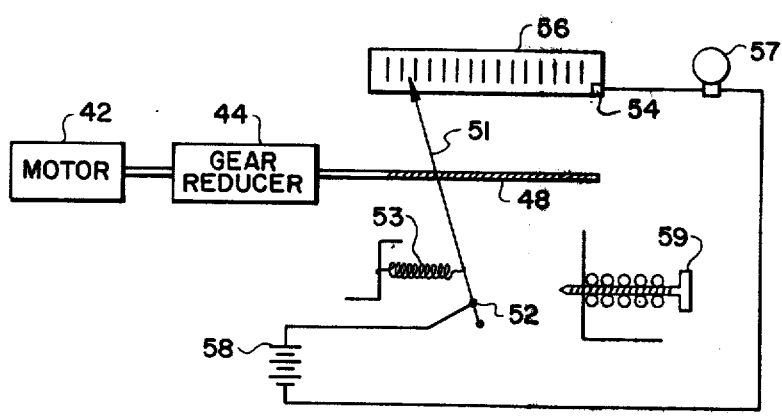
FIG. 5 is a diagram of another embodiment for integrating erythemal radiation for use with the circuit shown in FIG. 4.

With reference to FIG. 5, an alternative embodiment of the mechanical integrating means which may be used in place of counter 46 such as the Veeder-Root counter shown in FIG. 4. In this embodiment, motor 42 is mechanically connected to gear reducer 44 having a threaded output shaft 48. Shaft 48, for example, is provided with a 10/32nd thread which is engaged by pointer 51. Pointer 51 is mechanically and electrically connected to pivot 52 and includes spring biasing means 53. Preferably, pointer 51 is made of an electrically conductive metal and is adapted to make electrical contact with contact 54 on indicia face 56. Electrical contact 54 is preferably positioned at the erythemal threshold level to provide a complete circuit when needle 51 is in contact therewith. An alarm 57 is electrically connected to battery 58 and to contact 54. Battery 58 is also connected to pivot 52 of needle 51. A spring loaded reset needle 59 is used to reset the meter to zero upon reaching the erythemal threshold level.

Figure 6:
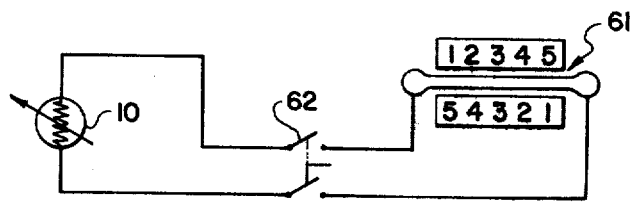
FIG. 6 is a diagrammatic view of a circuit for use with a microcoulometer and the sensing means shown in FIG. 1.

With reference to FIG. 6, erythemal sensing means 10' is electrically connected to electrochemical microcoulometer 61, such as manufactured by Curtis Instruments Incorporated, to provide an integrated output. In this case, the output of erythemal sensing means 10' is fed to a mercury capillary cell causing a small band of electrolyte to advance linearly along the capillary in direct proportion to the integrated current output of the cell. A reversing switch 62 is provided in the circuit to permit a reversal of the chemical reaction when the electrolyte indicator has reached either end of the scale. Range changes can be achieved with the microcoulometer by including a switch and resistive divider network. Microcoulometer 61 is also useful in a circuit shown and described with reference to FIG. 4 wherein the current gain is used to drive the microcoulometer. While the mercury microcoulometer requires less than 5.0 milliamps to actuate it, the rate of travel is limited by the capillary diameter.

It is clear, that other integrating circuits are useful in combination with the erythemal sensing means shown and described with reference to FIG. 1. Thus, while presently preferred embodiments have been shown and described in particularity, the invention may be otherwise embodied within the scope of the appended claims.

What is claimed is:

1. An erythemal radiation sensing means comprising an interference filter consisting essentially of a thin film having a vacuum deposition on one side adapted to transmit ultraviolet radiation of from 2800 to 3200 A, a magnesium tungstate phosphor coating on said other side of said interference filter thin film, a photocell having an active surface positioned substantially against said phosphor coating, and an elastomeric member for encapsulating said filter and photocell and including a window at one end to expose said thin film filter.

2. A sensing means as set forth in claim 1 wherein said photocell is a cadmium sulfide photocell.

3. An erythemal radiation sensing means comprising a first filter for filtering radiation of from 4600 to 6000 A; an interference filter comprising a thin film having a vacuum deposition on one side adapted to transmit radiation from about 2800 to 3200 A, said vacuum deposited side being positioned substantially against said first filter; a magnesium tungstate phosphor coating positioned on said other side of said thin film; a third filter adapted to absorb ultraviolet radiation positioned substantially against said phosphor coating; a fourth filter positioned substantially against said third filter and adapted to absorb infrared radiation; a photocell having an active surface, said active surface being positioned substantially against said fourth filter; and an elastomeric member for encapsulating said filters and photocell in said abutting relationships and including a window to expose said first filter.

4. An erythemal radiation sensing means as set forth in claim 3 wherein said photocell is a cadmium sulfide photocell.

5. An erythemal radiation sensing means as set forth in claim 3 wherein said magnesium tungstate phosphor is coated on the active surface of said photocell.

6. An erythemal sensing radiation means as set forth in claim 3 including an elastomeric washer member positioned between said first filter and said elastomeric encapsulating member, the opening of said washer lying within said window and being adapted to a size for calibration of said means.

7. An erythemal radiation sensing means as set forth in claim 3 including a tubular member positioned externally of said elastomeric member having a window coincidental with said window in said elastomeric member.

8. An erythemal radiation integrating means comprising an erythemal sensing means including a photocell, an amplifier means electrically connected to said photocell of said sensing means, a power supply electrically connected to said amplifier and sensing means photocell, an electrical motor electrically connected to said power supply and amplifier output and a counter means operably connected to said motor.

9. An erythemal radiation integrating means as set forth in claim 8 wherein said sensing means comprises the sensing means of claim 1.

10. An erythemal radiation integrating means as set forth in claim 8 wherein said sensing means comprises the sensing means as set forth in claim 3.

11. An erythemal radiation integrating means as set forth in claim 8 wherein said amplifier means comprises at least one transistor.

12. An erythemal radiation integrating means as set forth in claim 8 wherein said counter means includes gear reducer means operably connected to said motor, said gear reducer including an output shaft connected to a counter.

13. An erythemal radiation integrating means as set forth in claim 8 wherein said counter means comprises a gear reducing means operably connected to said motor, and including a threaded output shaft, an indicator needle engaged within said threads and movable therealong, said needle including pivot means, and an indicia plate positioned adjacent one end of said needle for indicating erythemal values by cooperation of said face and said needle.

14. An erythemal radiation integrating means as set forth in claim 13 including an electric alarm means, a power source connected to said alarm and to said needle; and an electrical contact positioned on said indicia plate at a erythemal threshold value, said alarm being electrically connected to said contact.

* * * * *